United States Patent
Erez et al.

(10) Patent No.: US 11,243,672 B2
(45) Date of Patent: Feb. 8, 2022

(54) SYSTEMS AND METHODS FOR AUTOMATICALLY ASSOCIATING OBJECTS WITH A VALUE

(71) Applicant: Loop Commerce, Inc., Stamford, CT (US)

(72) Inventors: Roy Erez, Palo Alto, CA (US); Alex Sirota, Los Altos, CA (US)

(73) Assignee: LOOP COMMERCE, INC., Mountain View, CA (US)

( * ) Notice: Subject to any disclaimer, the term of this patent is extended or adjusted under 35 U.S.C. 154(b) by 0 days.

(21) Appl. No.: 17/147,852

(22) Filed: Jan. 13, 2021

(65) Prior Publication Data

US 2021/0208755 A1 Jul. 8, 2021

Related U.S. Application Data

(63) Continuation of application No. 16/255,722, filed on Jan. 23, 2019, now Pat. No. 10,921,962.

(60) Provisional application No. 62/620,990, filed on Jan. 23, 2018.

(51) Int. Cl.
| | |
|---|---|
| G06F 3/0484 | (2013.01) |
| G06F 3/0481 | (2013.01) |
| G06F 16/25 | (2019.01) |
| G06F 16/23 | (2019.01) |
| G06Q 30/00 | (2012.01) |

(52) U.S. Cl.
CPC .......... *G06F 3/0484* (2013.01); *G06F 3/0481* (2013.01); *G06F 16/2379* (2019.01); *G06F 16/252* (2019.01); *G06Q 30/00* (2013.01)

(58) Field of Classification Search
CPC .. G06F 3/0484; G06F 3/0481; G06F 16/2379; G06F 16/252; G06Q 30/00
See application file for complete search history.

(56) References Cited

U.S. PATENT DOCUMENTS

| | | |
|---|---|---|
| 2005/0044508 A1 | 2/2005 | Stockton |
| 2007/0110012 A1 | 5/2007 | Abu-Amara |

*Primary Examiner* — Seth A Silverman
(74) *Attorney, Agent, or Firm* — Polsinelli

(57) ABSTRACT

Systems and methods for automatically generating a graphical interface include determining a counter value associated with a counter object and automatically determining one or more corresponding objects using the counter value. A subset of the one or more corresponding objects is determined and a graphical interface including the subset is generated. An updated counter value associated with the counter object is determined according to a modification and one or more updated corresponding objects are automatically determined using the updated counter value. An updated subset of the one or more updated corresponding objects is determined an updated graphical interface including the updated subset is generated and is transmitted, wherein when the updated graphical interface is received, the updated graphical interface facilitates a selection of an updated corresponding object from the updated subset.

30 Claims, 10 Drawing Sheets

SYSTEMS AND METHODS FOR AUTOMATICALLY ASSOCIATING OBJECTS WITH A VALUE

CROSS REFERENCE TO RELATED APPLICATIONS

This application is a continuation of U.S. patent application Ser. No. 16/255,722, filed Jan. 23, 2019, which claims benefit from U.S. Provisional Patent Application No. 62/620,990, filed Jan. 23, 2018.

FIELD

This application relates generally to a graphical interface. More specifically, exemplary aspects are directed to generating and transmitting a graphical interface to facilitate a selection of objects.

BACKGROUND

A host of objects can maintain a storage device for the objects. The host, however, may not have the hardware and/or software infrastructure that can enable automatic association of objects of the storage device with a counter value in a manner which is responsive to changing conditions. The changing conditions may relate to changes in the objects and/or modifications to the counter value. The host may also lack the capability to determine a subset of the objects based on the latest counter value. Information regarding the subset of the objects may be useful for a remote device. For instance, the remote device, equipped with the information regarding the subset, may be enabled to cause a change in the storage device of the objects in the host.

Accordingly, there is a recognized need for improved systems and methods for providing at least the above-mentioned capabilities to hosts of objects.

SUMMARY

Exemplary aspects of this disclosure are directed to systems and methods for automatically generating a graphical interface. An exemplary aspect is directed to determining a counter value associated with a counter object and automatically determining one or more corresponding objects, wherein a corresponding object is automatically determined using the counter value associated with the counter object, and wherein a corresponding object is associated with the counter object. A subset of the one or more corresponding objects is determined, based, for example, on secondary information and a graphical interface is generated, wherein the graphical interface includes the subset. The exemplary aspect further includes determining an updated counter value associated with the counter object, wherein a counter value is updated according to a modification and automatically determining one or more updated corresponding objects, wherein an updated corresponding object is automatically determined using the updated counter value associated with the counter object. An updated subset of the one or more updated corresponding objects is determined, based, for example, on secondary information and an updated graphical interface is generated, wherein the updated graphical interface includes the updated subset. The updated graphical interface is transmitted, wherein when the updated graphical interface is received, the updated graphical interface facilitates a selection of an updated corresponding object from the updated subset.

In some implementations, the above exemplary aspects are implemented in a computer-implemented method. In some implementations, a computer-program product tangibly embodied in a non-transitory machine-readable storage medium includes instructions configured to cause a data processing apparatus to perform operations according to the above exemplary aspects. Some implementations include a system, comprising one or more data processors and a non-transitory computer-readable storage medium containing instructions which, when executed on the one or more data processors, cause the one or more data processors to perform operations according to the above exemplary aspects.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Exemplary aspects of this disclosure are directed to computer systems and computer-implemented methods for automatically determining associations between a set of objects in an object storage device operated by a host device, and a counter value. The counter value may be obtained from a counter object. The counter value may be a variable, and the objects in the object storage device may also be variables. Thus, the associations between the counter value and the objects may vary such that a set of objects referred to as "corresponding objects" may be associated with a given counter value. The host device may include a control engine to determine the corresponding objects for a given counter value. The control engine may further operate to determine a subset of the corresponding values, possibly in conjunction with other secondary data. The subset may be provided to a source device, for example, by including the subset in a graphical interface and transmitting the graphical interface to the source device over a network.

The source device may receive the graphical interface and view the graphical interface on a client device. The graphical interface may facilitate a selection by the source device of one or more objects from the subset. The selection from the source device may be returned to the host device. The host device may update the object storage device as well as the counter object based on the selection received by the host device from the source device. One or more objects may also be transferred to the source device from a host based on the received selection.

Figure 1:
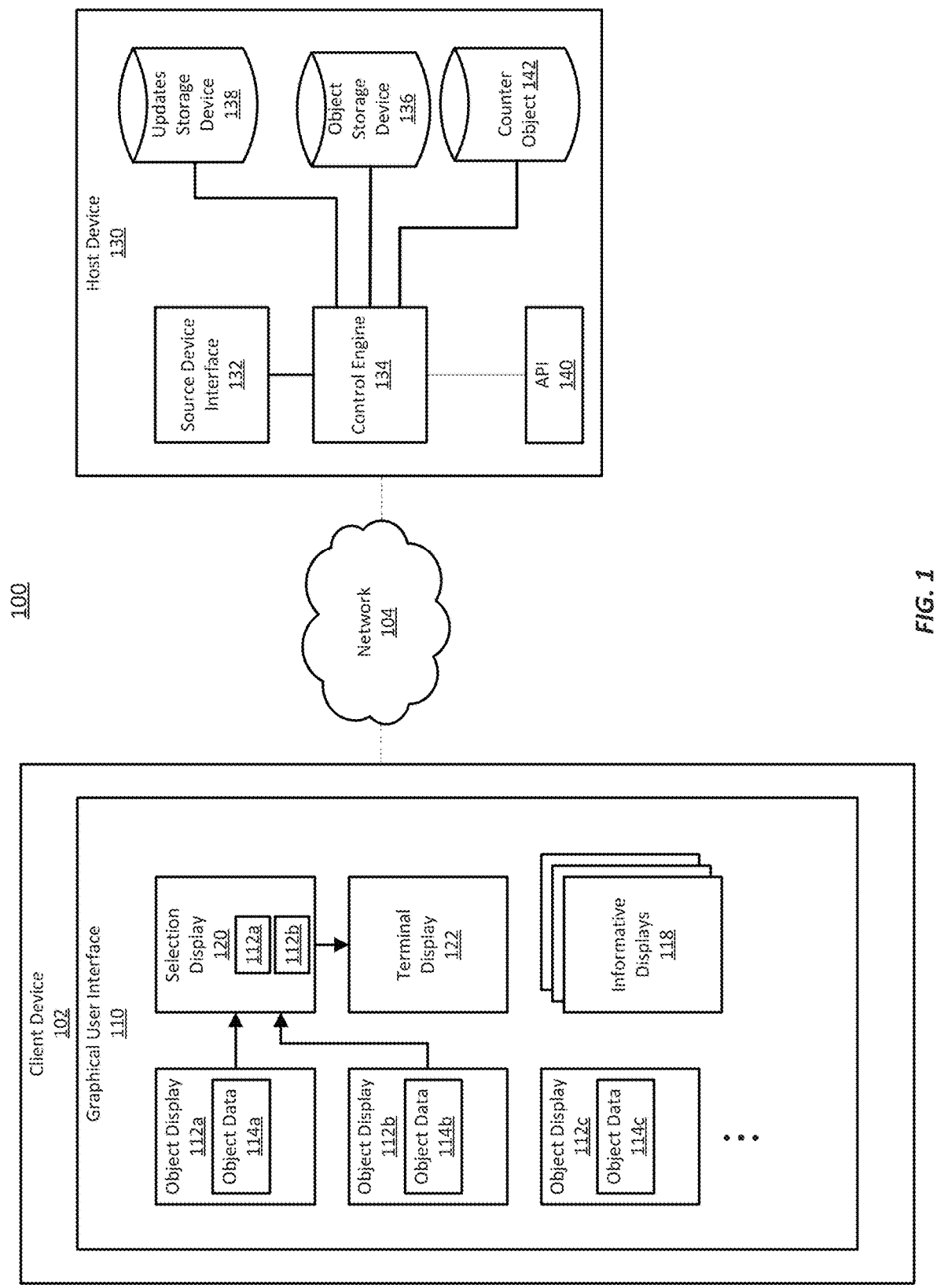
FIG. 1 illustrates an example of a system which includes a host device connected to a client device through a network, according to exemplary aspects of this disclosure.

FIG. 1 illustrates an example of a system 100 in which a host can communicate with a source device, and also facilitate the source device to effect modifications to an object storage device operated by the host. As illustrated, system 100 includes a host device 130, which may be a device or a network of devices. The host device 130 can communicate with a client device 102 over a network 104. The host device 130 may include computing systems configured to generate a graphical user interface 110 on the client device 102. The network 104 may include a public network such as the Internet. The network 104 may also include a private network controlled by the host device 130, but that is isolated (e.g. has distinct hardware and software, has a distinct IP address space, has a separate security perimeter, etc.) from the host device 130.

As discussed herein, a host may be a producer and/or distributor of objects. The objects can be physical objects, intangible objects such as pecuniary values or intellectual property, and/or services. The host may maintain the host device 130 so that source devices can obtain the objects produced and/or distributed by the host. To facilitate the source devices to obtain objects, computing systems in the host device 130 can generate a graphical interface. Providing the graphical interface to the source device can include, among other things, storing and maintaining data corresponding to, for example, the structure of the graphical user interface 110 and/or the elements that compose the graphical user interface 110. Providing the graphical user interface can further include transmission of this data to the client device 102, which can use the data to generate the graphical user interface 110 on a display device of the client device 102.

As shown in FIG. 1, the host device 130 includes a source device interface 132 and a control engine 134. The host device 130 also includes a counter object 142. The control engine 134 may receive a counter value from the counter object 142. The control engine 134 may control one or more storage devices such as the storage devices 136, 138 illustrated as an object storage device 136 and an updates storage device 138. In some implementations, the operations of the source device interface 132 and the control engine 134 can be implemented in a single physical device (e.g., a server computer) or in a combination of physical devices (e.g., a server farm). In some implementations, the host device 130 can also include an Application Programming Interface (API) 140 that may be used to generate the graphical interface and/or the data which may be transmitted to the client device 102 to generate the graphical user interface 110. The host device 130 can include other hardware, software, data, APIs, and/or systems that are not illustrated here.

The object storage device 136 can store information about the objects of the host. For example, the object storage device 136 can include an entry for each of the host's objects, possibly including both objects that are currently present and objects which may not be currently present in the host. An entry in the object storage device 136 for an object can include metadata for the object (e.g., a counter) and/or a description of the object. In some implementations, each object can also be associated with an identifier, where the identifier is associated with the specific combination of the metadata and description for the object. In some cases, two or more objects can have the same identifier, and the entry can indicate the number of objects with the same identifier (wherein the number being zero may indicate that the object is not present in the host). At some times and for some reasons, the host can remove objects from the object storage device 136, can add new objects, can change existing objects, can increase the number of a particular object, or make any other changes to the object storage device 136. Changes to the object storage device 136 can be caused by the host, or by authorized agents of the host. Changes to the object storage device 136 can also be effected by the source device, for example, based on the selection received from the source device.

In some implementations, the host device 130 can record updates to the object storage device 136 in the updates storage device 138. For example, the control engine 134 can store an entry in the updates storage device 138 that records information about any update that may be caused to the object storage device 136 due to a change in objects at the host or due to a change initiated by a source device. The update may include a list of the objects which were updated, a time and/or date when the update was finished, and/or a current status for the update, among other things. The updates storage device 138 can also store information about a source device which caused the update, including the source device's identification information and terminal information. In some cases, the control engine 134 may configure a source device data set (e.g., a source device name and password) for the source device, and store the source device data set in the updates storage device 138. Further, the updates storage device 138 may also record a code or an identifier of a counter object which may have been associated with the objects for which an update is recorded in the updates storage device 138.

The counter object 142 may be flexibly associated with one or more objects in the object storage device 136. The counter object 142 may have a counter value which may be updated. The counter object 142 may be used for updating one or more objects in the object storage device 136 based on the counter value (in some cases, in conjunction with another counter source). When the counter object 142 is initially created, the counter object 142 may have an initial counter value. Modifications to the counter object 142 may result in the counter value being updated to the updated counter value.

In some implementations, the host or a distribution center may create the counter object 142 from a counter object generator that can associate a specified counter value with the counter object 142. For instance, a source device may cause a distribution center to transfer a counter object to the source device. The distribution centers may be physical locations from where the host's objects can be transferred to source devices. In some cases, the host can transmit objects to a distribution center, rather than directly to a source device, and the distribution center can transfer the objects to the source device. When an object is transferred at a distribution center to a source device, the distribution center can then update the object storage device 136 to record the transfer. A distribution center may be controlled by the host, or may be controlled by another entity.

The counter object generator can generate the counter object 142 from a physical object that is associated with a code. The physical object can be, for example, a two-dimensional or a three-dimensional object constructed from paper, plastic, metal, or some other material. In addition to the counter value, a depiction of the two- or three-dimensional physical object or a picture, a graphic, or other information may also be associated with the counter object 142 that is generated. The control engine 134 may also store additional indications, such as the instantiation time along with the counter value and any other additional information in the counter object 142. It is understood that there may be several instances of counter objects such as the counter object 142 in the host device 130, each with its own respective counter value and code or identifier, as discussed herein with respect to the counter object 142.

In some cases, the counter object 142 may be associated with a type of objects. In some implementations, the counter object 142 can be associated with an identifier or code that the host device 130 can use to identify the counter object 142, and/or to control the use of the counter object 142.

In some cases, the counter object 142 can have an associated timer. The timer may be initialized when the counter object 142 is created and the timer may increment in units of time. It is possible for a timeout to be associated with the counter object 142, e.g., measured in days, weeks, months or possibly years, after which the counter object 142 may become invalid or incur other undesirable side effects (such as the counter value being diminished, restrictions being placed on the objects of the object storage device 136 which can be associated with the counter object 142, etc.). In aspects of this disclosure, it may be desirable to prevent the counter value of the counter object 142 from retaining a non-zero positive value before any such invalidation of the counter object 142 may occur. To avoid any such undesirable effects on the counter value of the counter object 142, objects corresponding to the counter value are automatically determined by the host device 130 and at least a representation of a subset thereof is transmitted to a source device to facilitate one or more objects corresponding to the counter value to be transmitted from the host to the source device. Such transmission to the source device may result in downward adjustment of the counter value, possibly to a zero value, and thus diminish the possibility of the counter value remaining a positive value.

As previously noted, the counter object 142 may be assigned an identifier or code by the host device 130. For example, the control engine 134 can communicate with the API 140 to generate a code for the counter object 142, which may be stored (e.g., in a separate counter code storage device). The counter value for a counter object may be received from a source device or from the network 104, e.g., by email or a secure message service. In some implementations, the control engine 134 can associate an object set with the counter object 134. The control engine 134 can, for example, access the object storage device 136 to identify objects that may individually or in combination be eligible for transfer to a source device based on the counter value of the counter object 142 and create the object set to include the identified objects. The object set can have been previously designated by the host. In some implementations, the association between the counter object 142 and the object set can be automatically performed by the control engine 134 based on any of the following types of changes detected by the control engine 134. An example change may be to the counter value of the counter object 142 or an update to any one or more objects in the object storage device 136, e.g., as determined from the updates storage device 138. Once an object set is determined based on a current counter value, e.g., an updated counter value of the counter object 142 and a current object set, e.g., an updated object set determined from the object storage device 136 and the updates storage device 138, the control engine 134 may select a subset of the object set. The subset may be determined from secondary information. The subset may be transmitted to a source device.

In some implementations, the counter object 142 can be created and initially associated with an object set at the time when a source device initiates creation of the counter object 142. In some implementations, the control engine 134 can associate the counter object 142 with the object set, and update a status of the counter object 142 to indicate that the counter object 142 is in an active state and may be utilized for future automatic updating of associations between the object set and the counter object 142 based on any modification to the counter value.

When the counter object 142 has been created and is active, the counter value may be modified, for example by control engine 134. The API 140 or the source device interface 132 may receive an update which causes the control engine 134 to effect a change to the counter value. For example, the counter value may be changed based on a notification from a distribution center, the host, or a source device. The control engine 134 may also presumptively adjust the counter value based on the object set association which has been stored in the selection storage device 144 in some implementations. The control engine 134 can also update the status of the counter object 142 to indicate a full or partial modification to the counter value. As previously mentioned, the control engine 134 may determine a set of one or more objects from the storage devices 136, 138 based on the updated counter value of the counter object 142. The control engine 134 may further determine a subset of the corresponding objects, based, for example, on secondary information which will be explained in further detail below.

The control engine 134 may automatically update the determination of the corresponding objects and/or the subset in at least some instances when there is a modification to the counter object 142 which results in a change in the counter value. The change may be an increase or a decrease in the counter value. The association between the counter object 142 and the objects in the storage devices 136, 138 may change when the counter value increases or decreases. Any updated association of the counter object 142 resulting in an updated corresponding object set may be determined by the control engine 134. Additionally or alternatively, the objects in the object storage device 136 may undergo changes in terms of the particular objects, the number of objects in a type, the metadata of the objects (e.g., the counter values of the objects), or a combination thereof. These changes in the objects may be recorded in the updates storage device 138. The control engine 134 may determine an updated association of objects with the counter value by receiving a notification of such updates from the updates storage device 138.

The control engine 134 may generate an updated association of the updated counter value of the counter object 142 and the object set determined from the storage devices 136, 138. The generation of the updated association may be dynamic and automatically performed at each instance that there is a change in either the counter value or any of the corresponding objects. The generation of the updated association may also be controlled by a timer or event. For instance, the control engine 134 may receive notification of a trigger to generate an updated association at one or more time instances, wherein the trigger may be generated based on the timer reaching certain milestones or based on the occurrence of certain events.

The control engine 134 may determine an updated subset of the updated corresponding objects based on the updated counter value and generate a graphical interface which includes or represents the updated subset. In one instance of generating the graphical display, a display code may be generated using the API 140. The display code may enable generation of a selectable interface at a client device, for example, to facilitate a source device to select one or more objects from the updated subset. The selectable interface may be a textual display, a graphical display, or the like. The graphical user interface 110 of the client device 102 in FIG. 1 is an example of the selectable interface.

The host device 130 may receive a selection of one or more objects from a source device, in response to the transmitted graphical interface. The source device interface 132 may receive, for example, the selection. When such a selection from the source device is received, the host device 130 can update the status of one or more objects identified in the selection by the source device, and the host can transmit the object to the source device. In some implementations, the source device to which an object is transmitted from the host can obtain the object from a distribution center instead of having the object transmitted from the host. Upon receiving an acknowledgment from the host device 130, the distribution center can then transfer the object to the source device.

In some implementations, the source device interface 132 can communicate with the control engine 134 to obtain the graphical interface and transmit the graphical interface to the client device 102 operated by a source device. The source device interface 132 may also be configured to possibly receive a selection from the source device in response to the transmitted graphical interface. The graphical interface transmitted by the source device interface 132 can include code to provide an object display such as the object displays 112a-c shown in the graphical user interface 110 of FIG. 1 for each object in the subset. The object displays 112a-c may also include a display related to the counter object 142 and its updated counter value. The object storage device 136 can further provide object data 114a-c to be included in the graphical user interface 110 corresponding to the object displays 112a-c. The object data 114a-c may include, for example, the metadata (e.g., counters) and/or descriptive information of the respective objects represented by the object displays 112a-c.

Using the graphical user interface 110, a source device can view and select objects from the host's storage device. The source device interface 132 may receive the selection from the source device. For instance, the source device interface 132 can include hardware and software systems configured to output, control, and receive input from a source device, which may be effected through the graphical user interface 110 of the client device 102 in an example. For example, the source device interface 132 can include pre-generated and/or dynamic graphical elements, pre-generated and/or dynamically generated text, display templates, and/or code for arranging graphical elements and/or text into the displays of the graphical user interface 110. As a further example, the object storage device 136, the updates storage device 138, and/or the counter object 142 can include graphics and/or text for each object, for object types, and/or the counter value, which the source device interface 132 can statically or dynamically add to the graphical user interface 110.

Generally, the displays provided by the graphical user interface 110 are accessible by source devices. In one example, the source device can navigate the graphical user interface 110 until the graphical user interface 110 displays a particular object display 112a. As noted above, object display 112a can illustrate a particular object type. In this example, the source device can use the object data 114a presentation to select from related metadata to reduce the object type to a particular object. Once the source device has specified any fixed and/or variable metadata, the source device can select a selection button 116a, which can cause the selected object to be added as a selected object in the selection display 120.

Once a source device has selected one or more objects, including specifying any associated metadata that define the objects, the source device can view the selected objects in the selection display 120. From the selection display 120, the source device may be able to make changes, including removing selected objects, or to add additional objects, the source device can return to the object displays 112a-112c.

The graphical user interface 110 can be accessed using the client device 102. The example client device 102 can be a computing system capable of providing a graphical display. Examples of such devices include desktop computers, laptop computers, handheld computers, personal digital assistants, smart phones, tablet computers, intelligent personal assistants, terminals, kiosks, televisions, gaming systems, entertainments systems, smart home assistants, and so on. Client devices can also include appliances, such as refrigerators, home security systems, automobiles, and any other device that includes a screen and an input mechanism (e.g., a keyboard, mouse, touchscreen, or other input device). In some implementations, the example client device 102 and the host device 130 can be located within the same network, such as for example within a firewall or similar security perimeter of the network 104. In some implementations, the example client device 102 can be located outside of the network in which the host device 130 is located, in which case, the network 104 can a private and/or public network, which can include the Internet. One example of a graphical user interface is a website.

To communicate the selection of objects in the selection display 120 to the host device 130, the graphical user interface 110 can include one or more terminal displays 122. Using the terminal displays 122, the source device can enter additional information for finalizing the selection of objects in the selection display 120. Such additional information can include, for example, the source device's identification data and a destination for the selected objects. One of the terminal displays 122 can include a button or other graphical element that, when activated by the source device, initiates the finalization. In some implementations, the terminal display 122 and the selection display 120 can be combined into a single display, or can be subdivided into sub-displays. The final selection of the objects, along with the additional information may be transmitted to the host device, e.g., through the network 104, which may initiate an update of the object storage device 136 of the host device 130.

In some implementations, the graphical user interface 110 can further include some informative displays 118. The host can use the informative displays 118 to provide information to a source device, such as information about the host, the host's policies regarding storage device updates or other communications with the host, contact information for the host, terms of use for the graphical user interface 110, legal information, and so on. In some implementations, the informative displays 118 may include temporary information and/or information that is updated frequently. For example, the informative displays 118 can include information about differentials that can be applied to the numerical counter for certain designated objects. In this example, rules may apply to the differentials. Such rules can include, for example, a time period or duration during which the differentials are valid, as well as the objects, object types, or other sets of objects to which the differentials apply, among other things. The rules can also include similar information as the differentials for the counter value, such as a time period or duration during which the counter value is valid. These rules can be included in an informative display 118.

Figure 2:
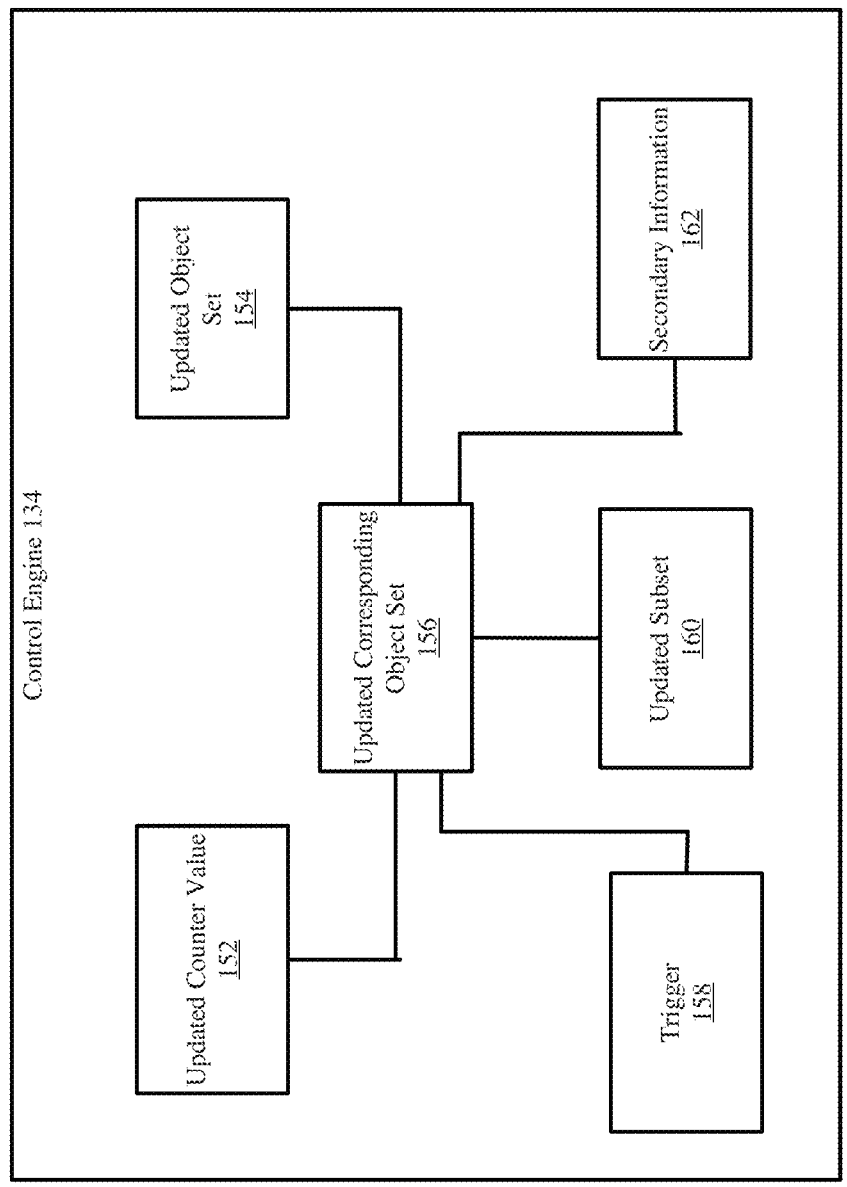
FIG. 2 illustrates a control engine of a host device, according to exemplary aspects of this disclosure.

With reference to FIG. 2, an example implementation of the control engine 134 of the host device 130 is shown. The control engine 134 may be implemented in a single physical device (e.g. a computer) or in a combination of physical devices (e.g., a computer network). In some implementations, the physical hardware that supports the control engine 134 can be provided to control engine 134 by a cloud services host (e.g., the hardware and at least some of the software is located in a data center operated by the cloud services host). In some implementations, the control engine 134 can include additional hardware, software, and/or data that is not illustrated here.

The control engine 134 may include modules or functional blocks (e.g., implemented in a suitable combination of hardware and software) as illustrated in FIG. 2 in one example implementation. The updated counter value 152 may be a module configured to receive a counter value from the counter object 142. If there are any changes to the counter value, based on modifications to the counter object 142, the changes are communicated to the updated counter value 152. The updated counter value 152 maintains the latest or most recently updated counter value of the counter object 142. In some cases, the counter value may be initialized when the counter object 142 is created, for example, by an instantiating source device. The counter value may decrease when some or all of the counter value is applied towards one or more objects of the object storage device 136 that are transmitted to a source device. The counter value may increase when a source device adds from an alternative counter source, counter value to the counter object 142. For example, the source device may associate the code for the counter object 142 at the source device interface 132 and cause the counter value of the counter object 142 to be increased by a specified number. A host may also cause the counter value of the counter object 142 to be increased based on one or more objects returned to the host from a source device when the returned objects are identified by the code associated with the counter object 142. In these cases, an update to the counter value may be conveyed from the host to the control engine 134 or to the updated counter value 152 from the updates storage device 138.

The updated object set 154 may be a module configured to maintain a current list of objects of the host. The updated object set 154 may be initialized with identifiers of the objects stored in the object storage device 136. The updated object set 154 may be updated to reflect any updates to the objects, as reflected in the updates storage device 138. For example, when one or more objects with entries in the object storage device 136 are transmitted to a source device from the host, the updates storage device 138 may record information about the objects transmitted, an identifier of the source device to which the objects were transmitted, a time and/or date when the entry in the updates storage device 138 was created to reflect the transmission or the update to the object storage device 136 to reflect that the transmitted objects are no longer listed in the entries of the object storage device. Furthermore, for the scenarios wherein the one or more objects transmitted were based on a selection by a source device in response to the transmitted subset from the host device 130, the code associated with the counter object 142 used in the generation of the subset may also be included in the updates storage device 138. This way, an increase in the counter value based on a return of such an object from the source device to the host can be communicated to the updated counter value 152.

The updated corresponding object set 156 represents a module configured to determine a set of updated corresponding objects from the updated object set 154 which may be associated with the updated counter value obtained from the updated counter value 152. The association between the updated corresponding objects and the updated counter value may be based on the metadata (e.g., counters) of the updated corresponding objects. In one example, the updated corresponding object set can be created by the updated corresponding object set 156 by include objects from the updated object set 154 whose counters are each less than or equal to the updated counter value. In some cases, a combination of counters of two or more objects of the updated object set 154 may be less than or equal to the updated counter value. It is also possible for the counters of one or more objects in the updated corresponding object set to be greater than the updated counter value, in which case an additional counter source may be utilized by a source device to finalize a selection of such an object, wherein counters from the additional counter source in conjunction with the updated counter value are of equal or greater magnitude than the counters of the object.

In addition to the updated counter value, the updated corresponding object set may also rely on secondary information in determining the updated corresponding object set. The secondary information 162 may be a module configured to track any secondary information which may be used, in conjunction with the updated counter value to determine the objects in the updated corresponding object set. Examples of the secondary information used by the secondary information 162 module include historical data and/or other data about the source device or client device 102, such as a geographical location and/or a network location, a log of objects previously transmitted to the source device, previously launched applications, a log of previous inputs (e.g., typing, mouse clicks, touch screen inputs, voice inputs, etc.), a log of previous geographical and/or network locations, and/or a log of recently visited websites or other network locations, among other things. In other examples, the secondary information may include previously stored associations between the counter object 142 (e.g., based on its code) and a set of objects. The objects in the storage devices 136, 138 may have associated scores (e.g., based on metadata such as their counters), number of transmissions to one or more source devices, performance profiles, etc., which may also be used as the secondary information.

In some cases, the updated corresponding object set may be created automatically by the updated corresponding object set 156 based on any updates or changes communicated from the updated counter value 152 and/or the updated object set 154. The automatic creation of the updated corresponding object set may be dynamic in nature, and responsive to the above-noted changes. The updated corresponding object set may be filtered or reduced to an updated subset of the updated corresponding object set using the secondary information, in one implementation. This updated subset may be stored in the updated subset 160 module, which may be a storage device.

The trigger 158 may be a module configured to supply a trigger based on a timer and/or an event. The updated corresponding object set 156 may also receive a trigger from the trigger 158. In addition to or as an alternative to the automatic or dynamic implementation discussed above, the trigger may be used in the generation of the updated corresponding object set and/or the subset.

In one example, the trigger 158 may include a timer which may have been initiated when the counter object 142 was created. The timer may be continuously incremented as long as the counter value remains positive (or is greater than a pre-determined threshold). The timer may have associated milestones. Each time the timer reaches a milestone, the trigger 158 may notify the updated corresponding object set 156 to generate an updated corresponding object set based on the updated counter value and the updated object set at the time the notification was received. Other implementations of the timer, such as resetting the timer to zero each time the trigger is generated, and repeating the process of generating another trigger when the timer reaches a predetermined or programmable value, may also be used.

In some implementations, the trigger may be generated based on an event. The event may be based on one or more source devices, and indications of the event may be stored in the host device 130, received from the host or from one or more source devices or client devices connected to the network 104. When any of these events occur, the trigger generated may notify the updated corresponding object set 156 to generate an updated corresponding object set based on the updated counter value and the updated object set at the time the notification was received. It is possible for a timer based trigger and an event based trigger to be related, independent, and/or coincide.

Accordingly, the updated subset of the updated corresponding object set is created and stored in the updated subset 160 automatically and/or based on triggers from the trigger 158. In some aspects, the updated subset may be a proper subset which includes less than all of the objects in the updated corresponding object set. In some aspects, the updated subset may include all of the objects in the updated corresponding object set.

Referring back to FIG. 1, the control engine 134 may provide the updated subset from the updated subset 160 to the API 140 to generate a graphical interface depicting the updated subset. In some aspects of generating the graphical interface depicting the subset, the API 140 may generate code which may be used by the client device 102 to generate the graphical user interface 110. In some aspects, the updated subset may be represented by any other interface which allows selection of one or more objects of the updated subset at a source device. The graphical interface, code, or other means for representing the objects of the updated subset may be transmitted to the client device 102 or any other source device through the source device interface 132, for example.

FIGS. 3A-F illustrate examples of the graphical user interface 110 which may be generated in the client device 102 from the updated subset. Specifically, the graphical user interfaces 110*i-n* shown in FIGS. 3A-F, respectively, depict examples wherein the updated subset of the updated corresponding objects may vary based on variations in the updated counter value and the updated object set, respectively obtained from the updated counter value 152 and the updated object set 154 shown in the control engine 134 of FIG. 2. The following description of FIGS. 3A-E also refers to FIGS. 1 and 2 for context.

Starting with FIG. 3A, the graphical user interface 110*i* illustrates object displays 112*i* and 112*a-f* which are similar to the object displays 112*a-c* previously discussed with reference to FIG. 1. The object display 112*i* corresponds to a graphical display of the counter object 142, while the object data 114*i* corresponds to a graphical display of the counter value and related information. More specifically, the object data 114*i* represents an initial counter value. The object displays 112*a-f* represent graphical displays of various objects in the updated subset, i.e., the subset of objects chosen from the updated corresponding object set which was determined based on the association between the counter value of the counter object 142 and the objects in the updated object set 154. More specifically, the object displays 112*a-f* represent graphical displays of an initial set of objects from the object storage device 136 which may be associated with the initial counter value shown in the object display 112*i*.

FIGS. 3B-F represent possible variations to the graphical user interface 110*i* which may be automatically generated by the host device 130 based on updates to the counter value of the counter object 142 and/or updates to the objects of the updated object set 154.

Figure 3A:
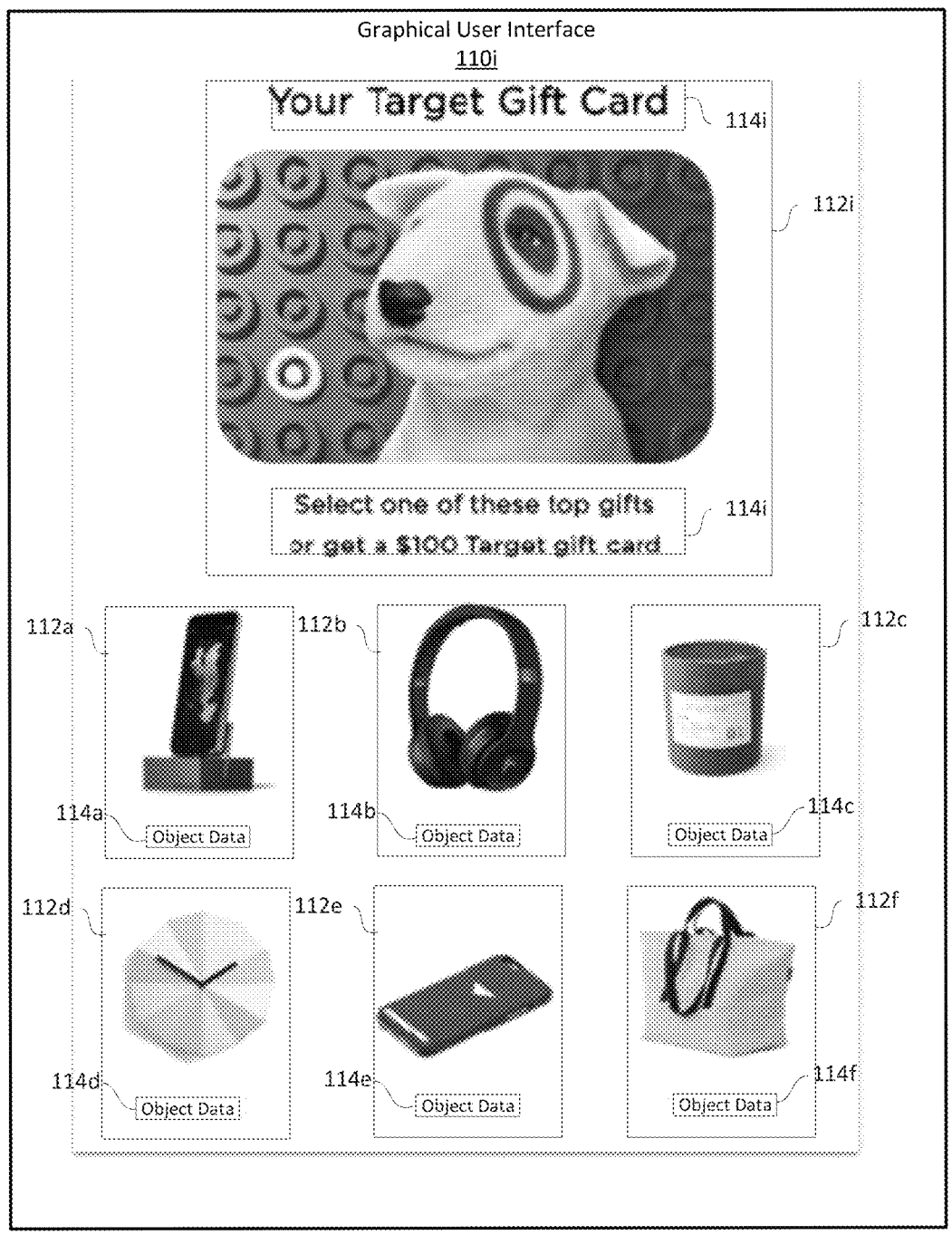
FIGS. 3A-F illustrate examples of graphical user interfaces which may be created on a client device based on a transmission from a host device, according to exemplary aspects of this disclosure.
Figure 3B:
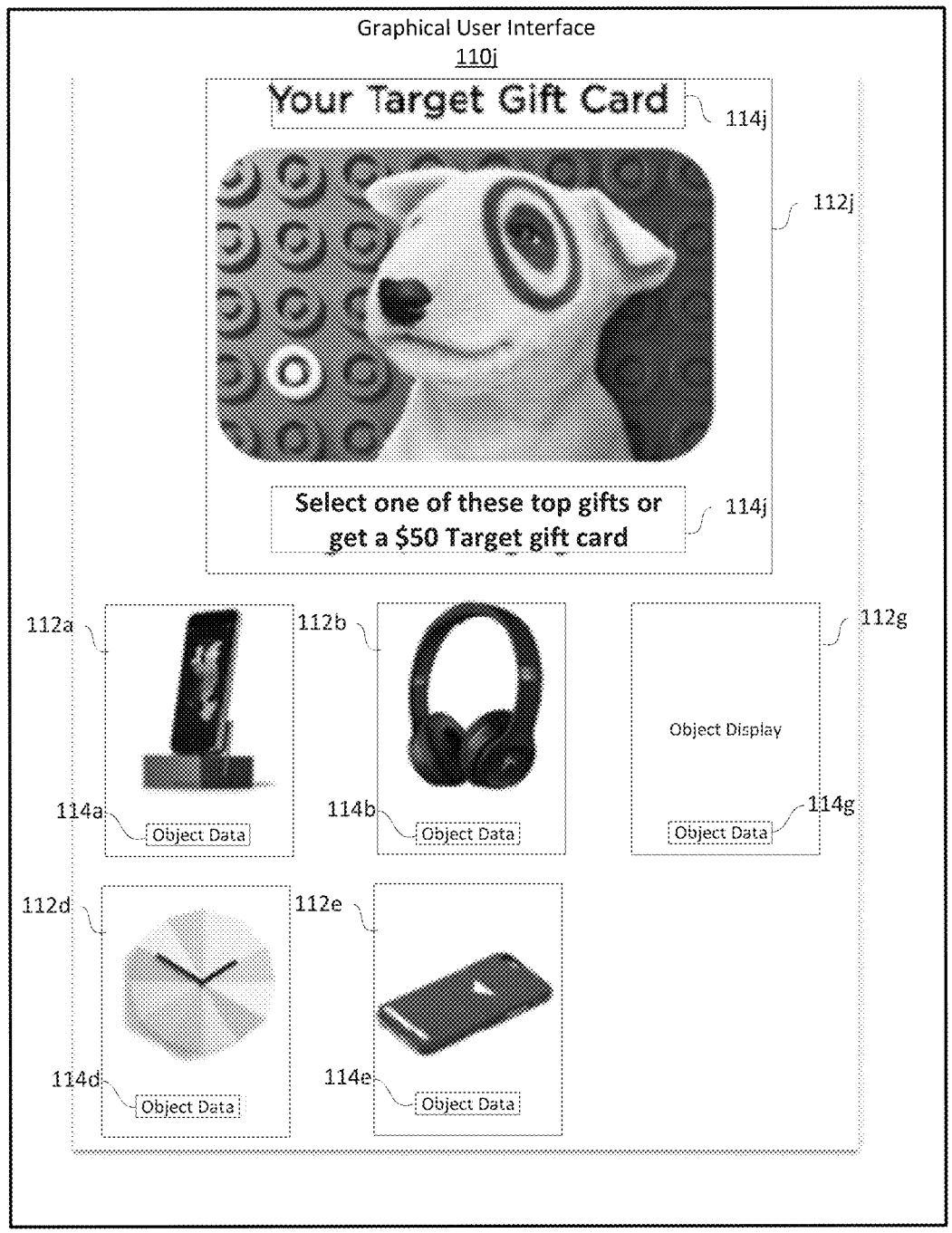

For instance, FIG. 3B shows the graphical user interface 110*j*, which includes an updated object display 112*j* and more specifically, a change in the object data 114*j* relative to the object data 114*i* shown in FIG. 3A. The object data 114*j* reveals that there has been a change in the counter value which resulted in the counter value decreasing from the initial counter value depicted in the object data 114*i* of FIG. 3A. Thus, the updated counter value depicted in the object data 114*j* is smaller than the initial counter value depicted in the object data 114*i*. Based on this update, the host device 130, and specifically, the control engine 134 consults the updated counter value 152 and the updated object set 154 to determine an updated corresponding object set and possibly an updated subset in the following manner.

In the illustrated example of FIG. 3B, the objects which had been represented by the object displays 112*c* and 112*f* in the graphical user interface 110*i* of FIG. 3A are no longer seen to be in the graphical user interface 110*j* of FIG. 3B. This is because the updated corresponding object set 156 created in the control engine 134 is based on the updated counter value, and the updated counter value is not associated with the objects which had been represented by the object displays 112*c* and 112*f*. This may be because the counters (e.g., part of the metadata displayed in the object data 114*c* and 114*f* respectively) for the objects which had been represented by the object displays 112*c* and 112*f* may be greater than the updated counter value. Additionally or alternatively, the secondary information derived from the secondary information 160 may also have caused a change resulting in the objects which had been represented by the object displays 112*c* and 112*f* having been removed from the graphical user interface 110*j*. Accordingly, the updated corresponding object set may no longer include the objects which had been represented by the object displays 112*c* and 112*f*.

On the other hand, a new object represented by the object display 112*g* may have a counter shown in the object data 114*g* which may be an appropriate object to be associated with the updated counter value, and this new object may be included in the updated corresponding object set. Correspondingly, the new object may be selected in the updated subset and displayed in the graphical user interface 112*j* as the object display 112*g* with the object data 114*g*. The secondary information may also play a role in the entry of the new object in the updated subset 160 in some cases.

Figure 3C:
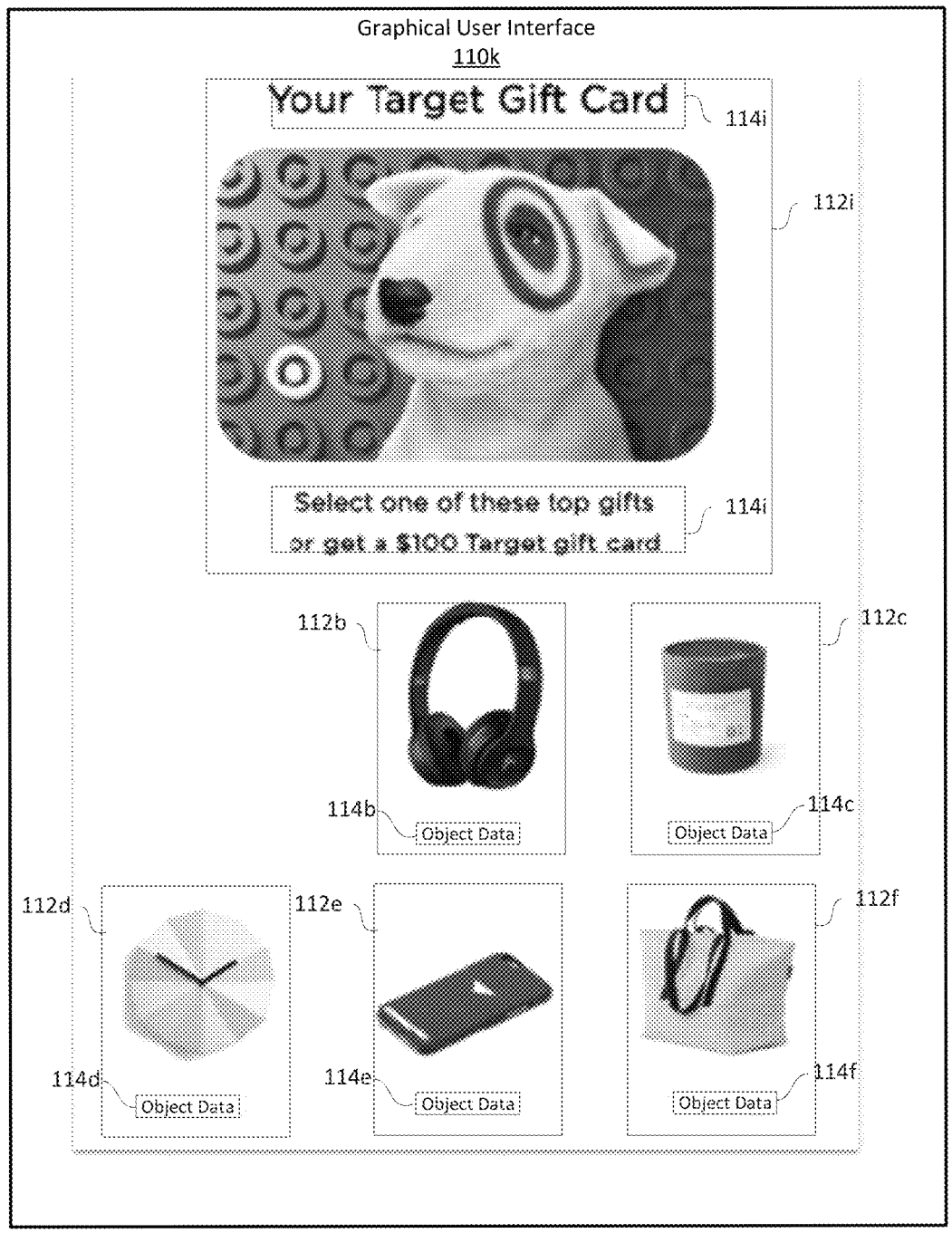

FIG. 3C shows the graphical user interface 110*k*, which shows another variation relative to the graphical user interface 110*i* of FIG. 3A. In FIG. 3C, the object display 112*i* representing the counter object 142 and its associated object data 114*i* representing the counter value are the same as those shown in FIG. 3A. However, the graphical user interface 110*k* omits the object display 112*a* which was shown in the graphical user interface 110i. This is because of a change which occurred in the object data 114a of the object display 112a.

The change in the object data 114a may be that the counter for the object represented by the object display 112a (e.g., derived from the object's metadata) may no longer be associated with the counter value of the counter object 142. Such a change in the object data 114a may be obtained by the control engine 134 from the updated object set 154.

Additionally or alternatively, the object display 112a may not be present in the graphical user interface 110k due to secondary information derived from the secondary information 162. For example, even if the updated corresponding object set 156 had been created in the control engine 134 as before, based on the secondary information, the updated subset 160 may be created without the object represented by the object display 112a being present in the updated subset 160. Therefore, the graphical user interface 110k is seen to exclude the object display 112a. As will be appreciated, the graphical user interface 110k reflects a scenario wherein the updated corresponding object set and/or an updated subset may be determined based on an association between the initial counter value of the counter object 142 and an updated object set.

Figure 3D:

FIG. 3D shows the graphical user interface 110l, which includes an updated object display 112l and more specifically, a change in the object data 114l relative to the object data 114i shown in FIG. 3A. The object data 114l reveals that there has been a change in the counter value which resulted in the counter value increasing from the initial counter value depicted in the object data 114i of FIG. 3A. Thus, the updated counter value depicted in the object data 114j is larger than the initial counter value depicted in the object data 114i. Based on this update, the host device 130, and specifically, the control engine 134 consults the updated counter value 152, the updated object set 154 to determine an updated corresponding object set 156 in the following manner.

In the illustrated example of FIG. 3D, the additional object displays 112x-z with corresponding object data 114x-z are shown in the graphical user interface 110l, in addition to the object displays 112a-f with respective object data 114a-f shown in the graphical user interface 110i of FIG. 3A. This is because the updated corresponding object set 156 created in the control engine 134 is based on the updated counter value, and the updated counter value is now associated with the additional objects represented by the object displays 112x-z. This may be because the counters (e.g., part of the metadata displayed in the object data 114x-z respectively) for the objects represented by the object displays 112x-z may also be less than or equal to the updated counter value, which is greater than the initial counter value.

Accordingly, the updated corresponding object set 156 may now include the objects represented by the object displays 112x-z. Correspondingly, the objects represented by the object displays 112x-z are also included in the updated subset and displayed in the graphical user interface 112l.

Figure 3E:
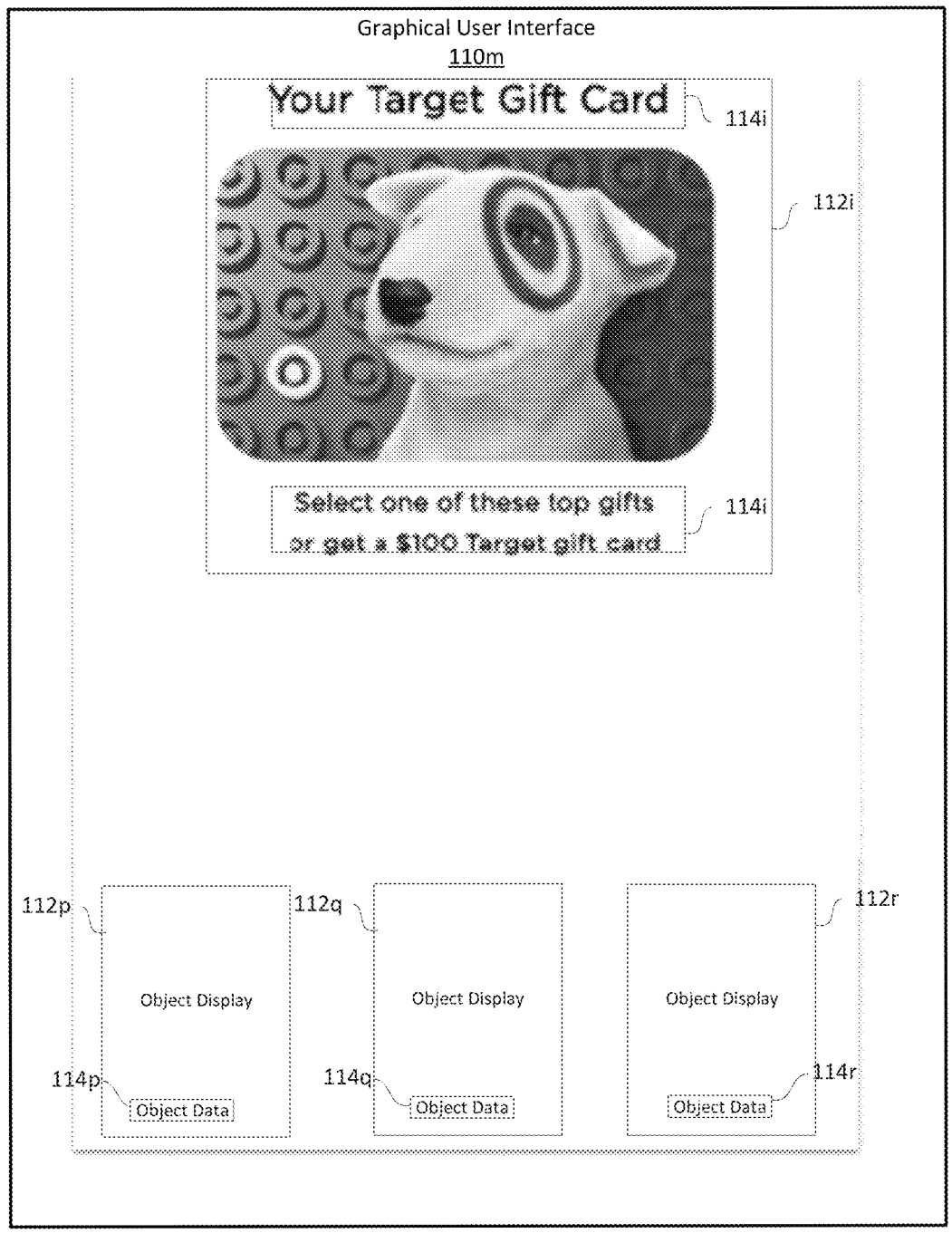

FIG. 3E shows the graphical user interface 110m, which shows another variation relative to the graphical user interface 110i of FIG. 3A. In FIG. 3E, the object display 112i representing the counter object 142 and its associated object data 114i representing the counter value are the same as those shown in FIG. 3A. However, the graphical user interface 110m omits the object displays 112a-f which were shown in the graphical user interface 110i. Instead, the graphical user interface 110m includes the new object displays 112p-r with respective object data 114p-r. This is because of an update to the object storage device 136 which may have caused the objects represented by the object displays 112a-f to have been removed, which would be reflected in the updates storage device 138 of the host device 130. The object storage device 136 may however have the objects represented by the object displays 112p-r present and associated with the initial counter value.

This scenario may represent a change in the object storage device 136 which may not necessarily be based on a change in the respective object data 112a-f of the objects represented by the object displays 112a-f, but possibly due to a change in the numbers of these objects represented by the object displays 112a-f in the object storage device 136. However, it is also possible that the graphical user interface 110m represents a scenario wherein one or more of the objects represented by the object displays 112a-f had been removed from the updated subset 160 due to secondary information derived from the secondary information 162.

On the other hand, new objects represented by the object displays 112p-r may be present in the object storage device 136 and have associated counters shown in their object data 114p-r which may be make them appropriate objects to be determined based on the initial counter value and placed in the updated corresponding object set 156 of FIG. 2. Correspondingly, the new objects may be selected in the updated subset 160 and displayed in the graphical user interface 112m as the object displays 112p-r with the object data 114p-r.

As will be appreciated, the graphical user interface 110m reflects a scenario wherein the updated corresponding object set 156 and/or an updated subset 160 may be determined based on an association between the initial counter value of the counter object 142 and an updated object set 154.

Figure 3F:

FIG. 3F illustrates an alternative wherein the graphical user interface 110n may exclude a depiction of the counter object, but only provide one or more of the object displays 112a-f which may correspond to the counter object 142. Moreover, a depiction of one or more of the corresponding object data 114a-f may also be excluded from a graphical user interface such as the graphical user interface 110n in yet other alternatives.

Figure 4:
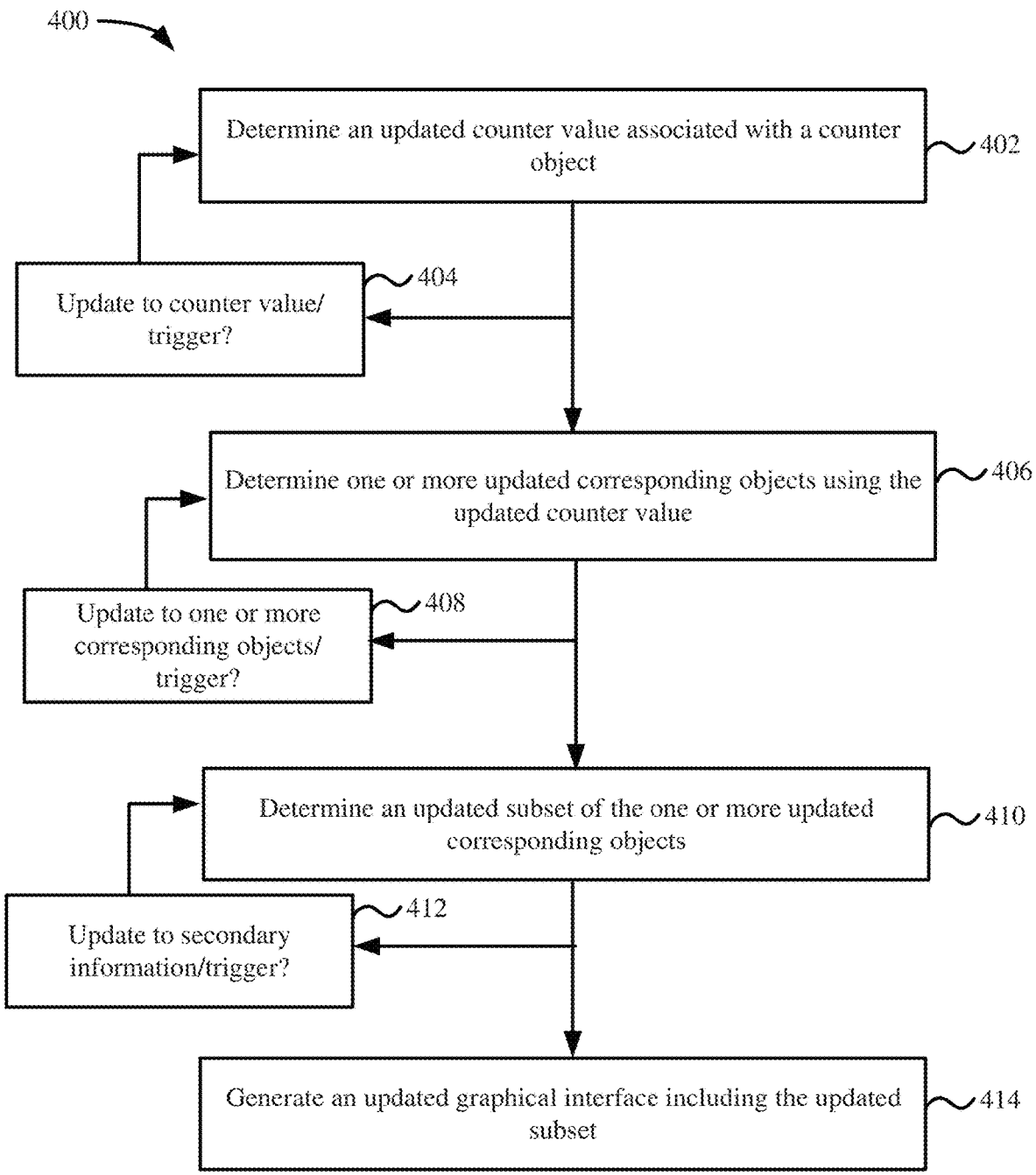
FIG. 4 illustrates an example process of automatically generating a graphical interface, according to exemplary aspects of this disclosure.

FIG. 4 illustrates an example process flow for automatically generating a graphical interface such as the graphical user interfaces 110i-m discussed above. Specifically, FIG. 4 illustrates a computer-implemented method 400 which may be implemented by the control engine 134 of FIGS. 1-2.

Starting with the step 402, the updated counter value 152 module of the control engine 134 may be used for initially determining a counter value associated with a counter object such as the counter object 142. In the step 404, if there are any modifications to the counter object 142 which result in an update to the counter value and/or upon receipt of a notification based on a timer or an event from the trigger 158 module, the step 402 may be automatically repeated to generate an updated counter value.

In the step 406, the updated corresponding object set 156 module may be used for automatically determining one or more corresponding objects, e.g., from the updated object set 154, using the updated counter value from the step 402. In the step 408, if there are any updates to the one or more corresponding objects in the updated object set 154 and/or upon receipt of a notification based on a timer or an event from the trigger 158 module, the step 406 may be automatically repeated to automatically determine one or more updated corresponding objects using the counter value or the updated counter value if there has been a modification to the counter object 142 resulting in the updated counter value.

In the step 410, a subset of the one or more corresponding objects is determined and stored in the updated subset 160, based, for example, on secondary information obtained from the secondary information 162 module. If in the step 406, the one or more updated corresponding objects were determined, then in the step 410, an updated subset of the one or more updated corresponding objects is determined and stored in the updated subset 160. If in the step 412, there is any update to the secondary information, and/or upon receipt of a notification based on a timer or an event from the trigger 158 module, the step 410 may be repeated to determine an updated subset accordingly.

In the step 414, a graphical interface including the subset from the step 410 may be generated. If there has been an update resulting in the updated subset being generated in the step 410, then in the step 414, an updated graphical interface including the updated subset from the step 410 is generated. In one example of generating the graphical interface or the updated graphical interface, the API 140 may generate any interface which may facilitate a selection of an object from the graphical interface or the updated graphical interface. The API 140 need not generate a display, but instead, may generate code which may be used to generate a display, such as the graphical user interface 110 in the client device 102. The graphical interface including the updated subset may be transmitted to the source device over the network 104 in any manner, which may include, for example, a link to the graphical interface or the code. The graphical user interface 110*i* may be an example of a graphical interface, while the graphical user interfaces 110*j-m* may examples updated graphical interfaces according to the examples of FIGS. 3A-E discussed above.

In one aspect, the host may be a merchant and the counter object may be a fully or partially unredeemed gift card of the host, with the counter value being the monetary value thereof. The one or more corresponding objects may be products of host which may be purchased with such a counter object. Metadata such as counters of the object may be costs of the objects. The secondary information may include analytics, user ratings, or other metrics which may be used to recommend the objects to the source device which may be a user. The host device may be controlled by the host, wherein the host device may be configured to automatically detect an updated counter value and updated corresponding objects to provide recommendation in the form of the subset to the source device.

Figure 5:
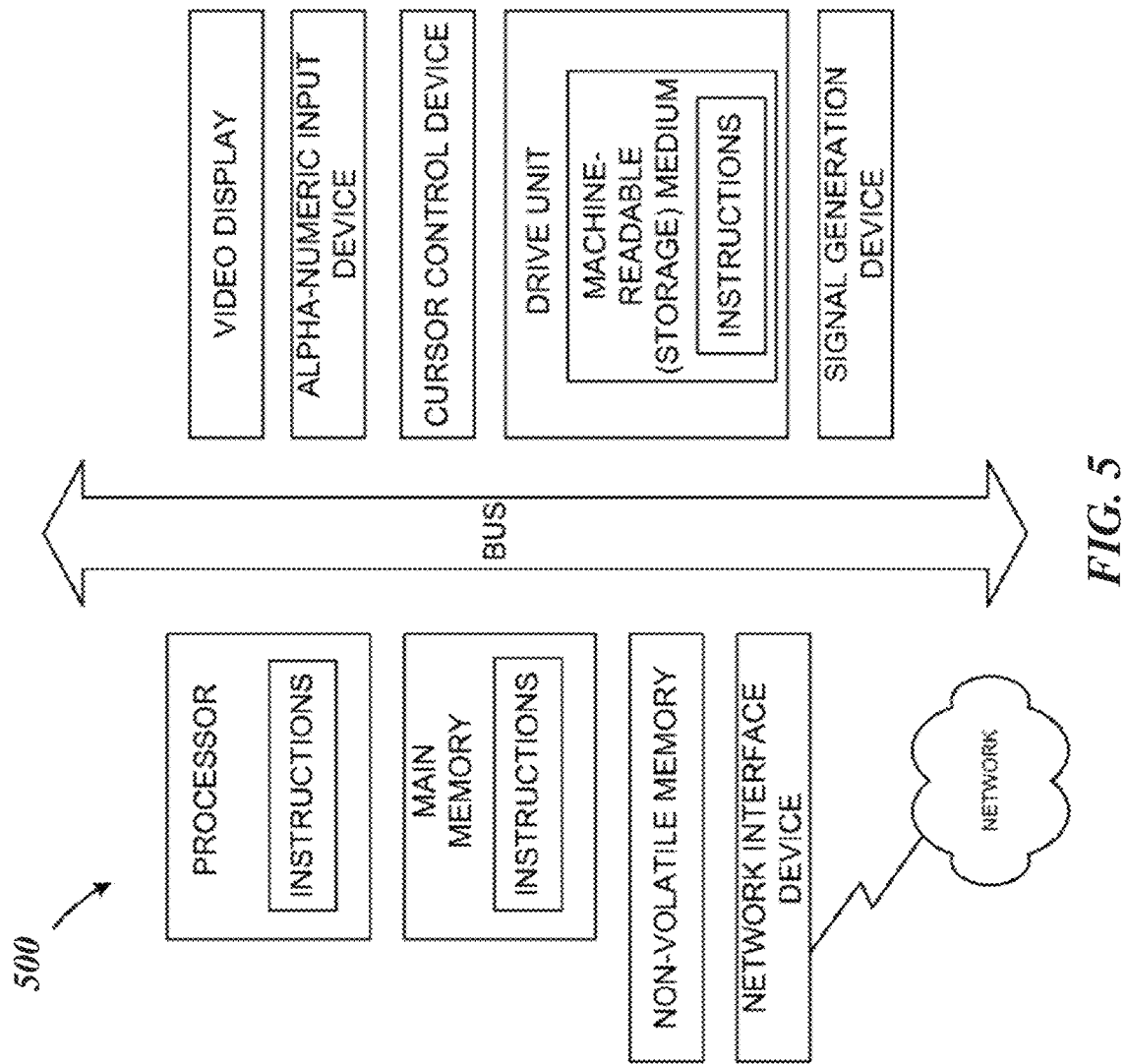
FIG. 5 illustrates an exemplary computer system configured to perform any one or more functions discussed herein.

FIG. 5 illustrates an example of a computer system 500. The computer system 500 includes a processor, memory, non-volatile memory, and an interface device. Various common components (e.g., cache memory) are omitted for illustrative simplicity. The computer system 500 is intended to illustrate a hardware device on which any of the components depicted in the example of FIGS. 1, 2, and 3A-E (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™. operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112, ¶6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    storing data regarding a plurality of objects in a storage device, wherein the stored data for an object includes a counter cost;
    identifying online navigation by a computing device, the online navigation associated with one or more of the objects;
    determining that one or more differentials are applicable to the computing device, wherein applying the differentials modifies counter costs associated with one or more of the objects;
    filtering the objects based on a counter redemption value and the counter costs as modified by the differentials, wherein filtering the objects results in an identified subset of the objects; and
    generating a graphic interface for the computing device, wherein the graphic interface includes the identified subset, and wherein the identified subset within the graphic interface is dynamically updated based on a change to the counter redemption value or the counter costs.

2. The computer-implemented method of claim 1, wherein the differentials are defined by one or more rules, the rules further specifying one or more conditions for applying the differentials.

3. The computer-implemented method of claim 2, wherein the one or more conditions include a time period during which to apply the differentials, and wherein determining that the differentials are applicable to the computing device includes determining that the online navigation by the computing device occurs during the time period.

4. The computer-implemented method of claim 1, wherein the graphic interface is further updated based on a trigger.

5. The computer-implemented method of claim 4, wherein the trigger is a timer associated with one or more milestones, and further comprising:
    generating a notification regarding updating the identified subset when the timer reaches one of the milestones.

6. The computer-implemented method of claim 1, wherein filtering the objects is further based on historical data regarding the computing device.

7. The computer-implemented method of claim 1, wherein filtering the objects is further based on a location of the computing device.

8. The computer-implemented method of claim 1, wherein filtering the objects is further based on scores associated with the objects.

9. The computer-implemented method of claim 1, wherein filtering the objects is further based on a number of transmissions associated with objects.

10. The computer-implemented method of claim 1, further comprising:
    changing the counter redemption value in response to a selection of one of the identified subset of objects in the graphic interface, wherein the counter redemption value is changed based on the counter cost of the selected object.

11. A system, comprising:
a storage device that stores data regarding a plurality of objects, wherein the stored data for an object includes a counter cost; and
one or more data processors that execute a non-transitory computer-readable storage medium containing instructions to perform operations including:
identify online navigation by a computing device, the online navigation associated with one or more of the objects;
determine that one or more differentials are applicable to the computing device, wherein applying the differentials modifies counter costs associated with one or more of the objects;
filter the objects based on a counter redemption value and the counter costs as modified by the differentials, wherein filtering the objects results in an identified subset of the objects; and
generate a graphic interface for the computing device, wherein the graphic interface includes the identified subset, and wherein the identified subset within the graphic interface is dynamically updated based on a change to the counter redemption value or the counter costs.

12. The system of claim 11, wherein the differentials are defined by one or more rules, the rules further specifying one or more conditions for applying the differentials.

13. The system of claim 12, wherein the one or more conditions include a time period during which to apply the differentials, and wherein determining that the differentials are applicable to the computing device includes determining that the online navigation by the computing device occurs during the time period.

14. The system of claim 11, wherein the graphic interface is further updated based on a trigger.

15. The system of claim 14, wherein the trigger is a timer associated with one or more milestones, and wherein the processors execute further instructions to:
generate a notification regarding updating the identified subset when the timer reaches one of the milestones.

16. The system of claim 11, wherein filtering the objects is further based on historical data regarding the computing device.

17. The system of claim 11, wherein filtering the objects is further based on a location of the computing device.

18. The system of claim 11, wherein filtering the objects is further based on scores associated with the objects.

19. The system of claim 11, wherein filtering the objects is further based on a number of transmissions associated with objects.

20. The system of claim 11, further comprising:
changing the counter redemption value in response to a selection of one of the identified subset of objects in the graphic interface, wherein the counter redemption value is changed based on the counter cost of the selected object.

21. A non-transitory computer-readable storage medium including instructions executable to perform a method comprising:
storing data regarding a plurality of objects in a storage device, wherein the stored data for an object includes a counter cost;
identifying online navigation by a computing device, the online navigation associated with one or more of the objects;
determining that one or more differentials are applicable to the computing device, wherein applying the differentials modifies counter costs associated with one or more of the objects;
filtering the objects based on a counter redemption value and the counter costs as modified by the differentials, wherein filtering the objects results in an identified subset of the objects; and
generating a graphic interface for the computing device, wherein the graphic interface includes the identified subset, and wherein the identified subset within the graphic interface is dynamically updated based on a change to the counter redemption value or the counter costs.

22. The non-transitory computer-readable storage medium of claim 21, wherein the differentials are defined by one or more rules, the rules further specifying one or more conditions for applying the differentials.

23. The non-transitory computer-readable storage medium of claim 22, wherein the one or more conditions include a time period during which to apply the differentials, and wherein determining that the differentials are applicable to the computing device includes determining that the online navigation by the computing device occurs during the time period.

24. The non-transitory computer-readable storage medium of claim 21, wherein the graphic interface is further updated based on a trigger.

25. The non-transitory computer-readable storage medium of claim 24, wherein the trigger is a timer associated with one or more milestones, and further comprising:
generating a notification regarding updating the identified subset when the timer reaches one of the milestones.

26. The non-transitory computer-readable storage medium of claim 21, wherein filtering the objects is further based on historical data regarding the computing device.

27. The non-transitory computer-readable storage medium of claim 21, wherein filtering the objects is further based on a location of the computing device.

28. The non-transitory computer-readable storage medium of claim 21, wherein filtering the objects is further based on scores associated with the objects.

29. The non-transitory computer-readable storage medium of claim 21, wherein filtering the objects is further based on a number of transmissions associated with objects.

30. The non-transitory computer-readable storage medium of claim 21, further comprising:
changing the counter redemption value in response to a selection of one of the identified subset of objects in the graphic interface, wherein the counter redemption value changed based on the counter cost of the selected object.

* * * * *